June 26, 1962 J. E. HURTLE 3,040,529
PNEUMATIC FUEL CONTROL
Filed Dec. 31, 1958 3 Sheets-Sheet 1

INVENTOR.
JAMES E. HURTLE
BY
William S. Thompson
AGENT.

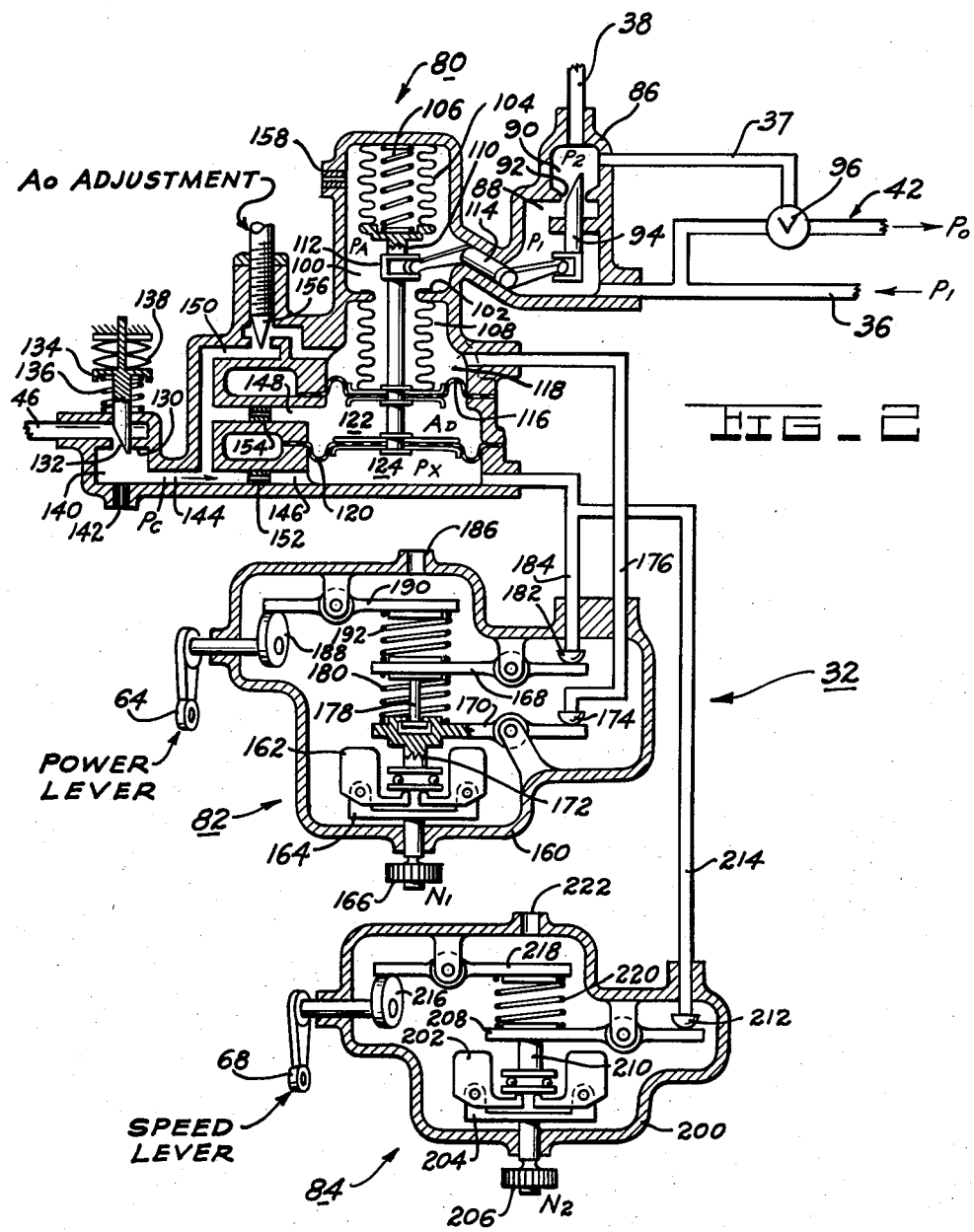

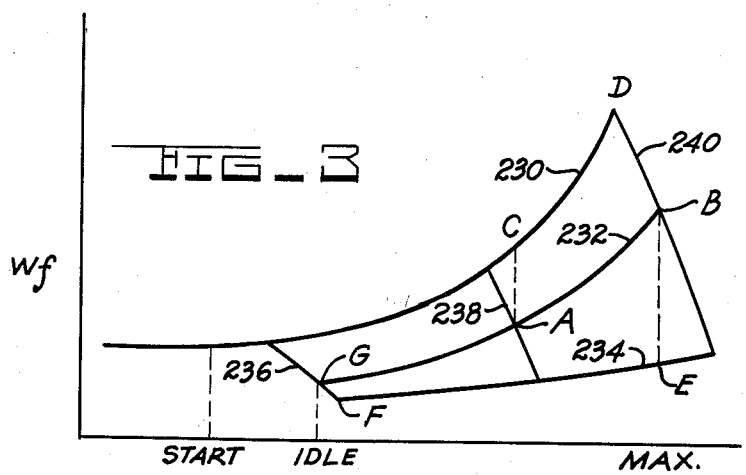
FIG_3
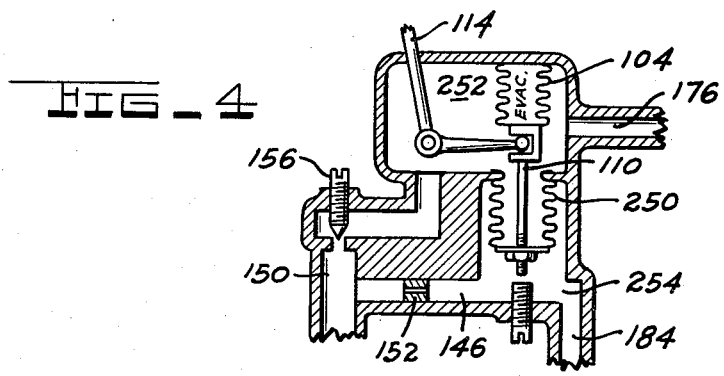
FIG_4
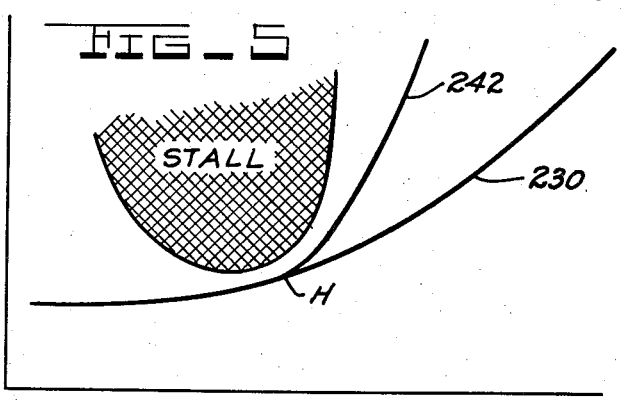
FIG_5

United States Patent Office 3,040,529
Patented June 26, 1962

3,040,529
PNEUMATIC FUEL CONTROL
James E. Hurtle, South Bend, Ind., assignor to The Bendix Corporation, a corporation of Delaware
Filed Dec. 31, 1958, Ser. No. 784,323
19 Claims. (Cl. 60—39.28)

The present invention relates to a fuel control and supply system for a gas turbine engine and more particularly to fuel control apparatus having pneumatic pressure responsive means for controlling the rate of fuel supplied to an engine.

The fuel control apparatus of the present invention is herein described as operative with a free turbine gas turbine engine, as this mode of description serves to more fully disclose the function, operation and novelty of my present invention. However, it should be understood that the present invention would be operative with other various types of gas turbine engines subject only to the limitations appearing in the appended claims. For purposes of this disclosure, a free turbine gas turbine engine is defined as an engine in which a basic compressor and turbine unit act as a gas generator to develop power in the exhaust gas which is transmitted to a free running power turbine. The power turbine in turn is utilized to drive any desired output device.

When controlling the rate at which fuel is supplied to a gas turbine engine, it is often desirable to use a metering valve which is controlled by pneumatic pressure responsive means which in turn senses a compressor generated pressure. This mode of control has the advantage of low cost, simplicity, and reliability as it becomes unnecessary to convert a compressor generated pneumatic pressure to an equivalent hydraulic fluid pressure and operate through complex servo systems to position a metering valve. In addition, compressor generated pressures are appropriate parameters for scheduling the acceleration fuel flow requirements to an engine as they represent a combined function of engine compressor speed, altitude, the density of surrounding air, and the efficiency characteristics of the compressor. Governing operation may be readily provided to the system above described by merely exhausting varying quantities of the compressor generated air to the atmosphere, such as for example as shown in copending application Serial No. 738,336, filed May 28, 1958, Alexander A. Stefucza and Wendell P. Spurgin, inventors, and assigned to the same assignee as is the present application. Fuel control systems as described above have the limitation that the minimum fuel flow which can be supplied to the engine is that established by atmospheric pressure, as the governor is only capable of exhausting the actuating compressor generated pressure down to the pressure level of outside air. This limitation is serious when the fuel required to maintain the engine at steady state operation is at anytime less than that necessary to accelerate the engine at atmospheric pressure. In addition, the sensitivity of fuel flow change in the governing range of operation is limited, as the same pressure change is necessary for a given fuel flow change in the governing range of operation as in the accelerating range.

Accordingly, it is an object of the present invention to provide a pneumatic pressure responsive fuel control responsive to an engine compressor generated pressure that is capable of scheduling a lesser fuel flow in the governing range of operation than the minimum fuel flow of the acceleration range.

It is another object of the present invention to provide a compressor generated air pressure responsive fuel control having greater sensitivity in the governing range of operation than in the accelerating range.

It is a further object of the present invention to provide a compressor generated air pressure responsive fuel control including speed means for varying the acceleration flow schedule.

It is another object of the present invention to provide a compressor generated air pressure responsive fuel control having means responsive to ambient air temperature for controlling the value of actuating compressor generated air pressure.

It is another object of the present invention to provide a pneumatic pressure responsive fuel control for a free turbine gas turbine engine.

Other objects and advantages will become apparent in view of the following description taken in conjunction with the drawings wherein:

FIGURE 2 is a sectional schematic of the fuel control system of the present invention;

FIGURE 3 is a first graph showing operating characteristics of the present invention;

FIGURE 4 is a sectional schematic of a modification of a portion of the fuel control system illustrated in FIGURE 2; and FIGURE 5 is a second graph showing further operating characteristics of the present invention.

Figure 1:
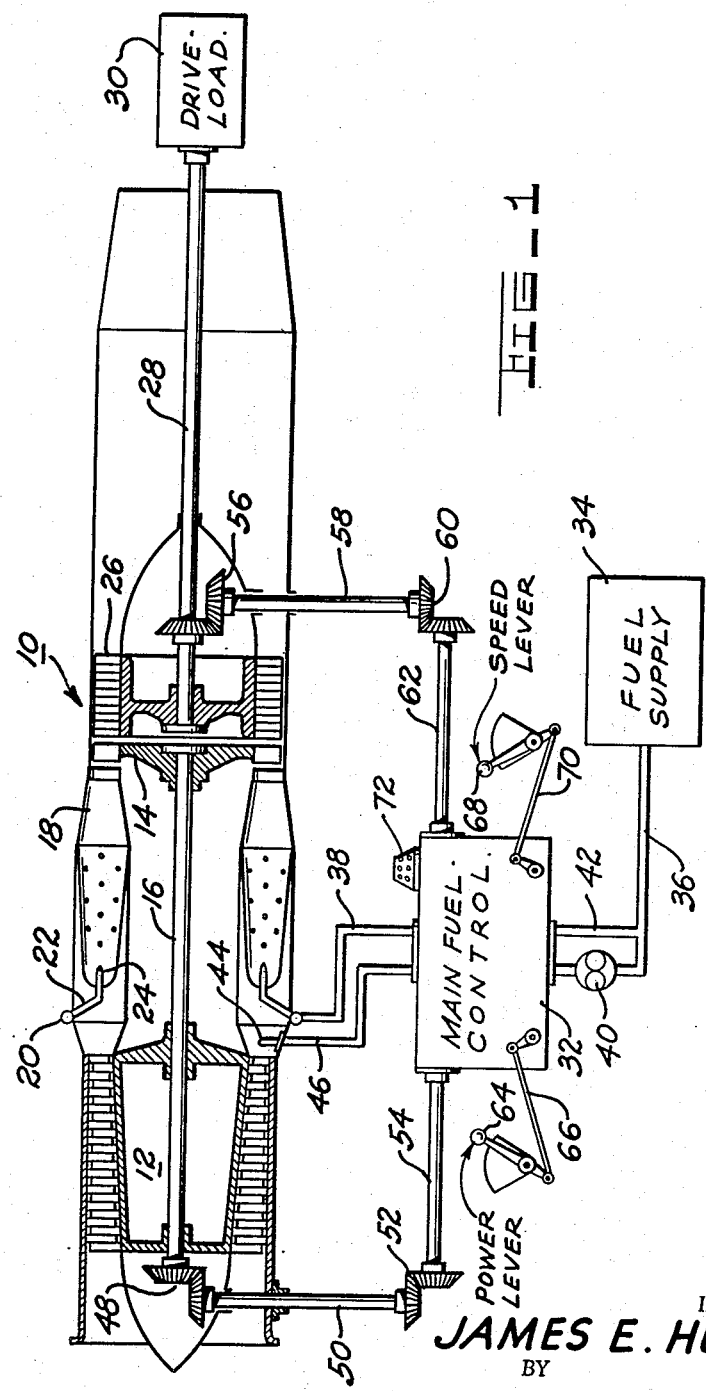
FIGURE 1 is a diagrammatic view of a fuel supply and control system in association with an engine in accordance with the present invention.

Referring to FIGURE 1 there is shown a fuel supply and control system including a free turbine gas turbine engine generally indicated by numeral 10, including a compressor 12, a first turbine 14, and a drive shaft 16 connected between said compressor and said turbine. A plurality of combustion chambers 18 are provided and are supplied fuel from a common fuel manifold 20 through individual fuel lines 22 and nozzles 24. The engine includes a second turbine 26 located in the tailpipe of the engine and which is mechanically connected through a drive shaft 28 to the loading device 30 which may be representative of any device to be driven. A main fuel control 32 is provided for controlling a supply of fuel from the tank 34 through conduits 36 and 38 to fuel manifold 20. Supply pump 40 is located in conduit 36 and is operative to pressurize the supply fuel to main control 32. Conduit 42 returns excess fuel from main control 32 to the inlet of pump 40 for recirculation. The operation of main fuel control 32 is determined by a compressor generated pressure as sensed by pressure pick-up device 44 and transmitted through conduit 46; the rotative speed of the first turbine 14 as transmitted through bevel gear 48, shaft 50, bevel gear 52, and shaft 54; the rotative speed of the second turbine 26 as transmitted through bevel gears 56, shaft 58, bevel gears 60, and shaft 62; the position of manual power lever 64 as transmitted through linkage 66; the position of speed lever 68 as transmitted through linkage 70; and ambient air temperature communicating with the perforated cup member 72. The perforated cup member 72 is readily detachable from the main control 32 and remotely positionable at any point with respect to engine 10 where it is desired to sense ambient air temperature.

Referring to FIGURE 2, my main control 32 is shown in greater detail and is comprised of three main segments: first, a pneumatic pressure responsive fuel regulating device 80; second, a first speed responsive device 82; and third, a second speed responsive device 84. Referring specifically to the pressure responsive fuel regulator device 80, high pressure inlet fuel designated $P_1$ is supplied thereto by means of conduit 36. Housing 86 of the regulating device 80 forms a first and a second fluid chambers 88 and 90 respectively and a restrictive orifice 92 therebetween. Axially slideable metering valve 94 is operative with restrictive orifice 92 to provide a variable flow metering area whose effective area is dependent on the axial position of metering valve 94. Fuel supplied by inlet conduit 36 is metered as it passes through the variable orifice formed by restriction 92 and metering valve 94 and passes into the chamber 90, and from there is transmitted to the outlet conduit 38 which is connected to the manifold 20 of the engine 10, as shown in FIGURE 1. Excess fuel supplied by conduit 36 to the regulator 80 is transmitted through the conduit 42 and conventional by-pass valve 96 back to the inlet side of supply pump 40, as illustrated in FIGURE 1. The by-pass valve 96 is operative to maintain a constant pressure differential across metering valve 94 by returning varying quantities of fuel to the pump inlet in a manner well known in the fuel metering art. Housing 86 of the regulator device 80 further forms a large interior chamber 100 which is divided into an upper and lower segment by annular projection 102 extending inwardly from housing 86. The upper segment of chamber 100 includes an evacuated and sealed bellows member 104 which is fixedly secured to the upper end of said chamber and includes a spring member 106 contained interiorly. A second bellows 108 is contained in the lower segment of chamber 100 and is connected to annular projection 102 on one end, and extends downwardly therefrom to provide a movable wall between the upper and lower segments of chamber 100. The movable end of bellows 104 and 108 are interconnected by means of rod 110 which further includes a bracket 112. An interconnecting lever 114 is provided, and engages bracket 112 on one end and metering valve 94 on the other so as to transmit axial movement of rod 110 to said metering valve, and is arranged to prevent any leakage of fuel or air between the chambers 88 and 100. A first diaphragm 116 is fixedly secured at its outer edge by housing 86 and is connected at its center to the movable rod 110 so as to form the chamber 118 with bellows 108. Diaphragm 116 is designed to have a larger effective area than bellows 118 for purposes which will later be described in detail. A second diaphragm 120 is also secured at its outer edge to the housing 86 and at its center to movable rod 110 to form the additional chambers 122 and 124 as shown. Diaphragm 120 is designed to have a larger effective area than diaphragm 116 as will also be described hereinafter. Air pressure generated by the compressor 12 of the engine 10 is transmitted through the conduit 46 and restriction 130 formed by an annular projection of housing 86. Valve 132 is operative with restriction 130 to provide a variable air controlling orifice which controls the air flowing therethrough in response to the actual position of said valves. The valve member 132 includes a disc projection 134 which engages on its lower surface the spring member 136 so as to absorb a force tending to move said valve member upward. This projection 134 further engages temperature compensating disc members 138 on its upper surface so as to be axially positionable in response to the expansion and contraction of said temperature disc members. Temperature compensating disc members 138 are located in close proximity to the perforated cup member 72, shown in FIGURE 1, so as to be in communication with ambient air and therefore responsive to the temperature of said ambient air. The air passing through the variable orifice formed by valve 132 and restriction 130 is transmitted to the chamber 140. Fixed restrictive bleed member 142 is contained in the wall of housing 86 and in communication with chamber 140 to insure a minimum flow of air past the valve member 132 by exhausting a small quantity of air to the atmosphere. The continuous flow of air through orifice 130 will cause a pressure differential across said orifice that varies with the position of valve 132 so that the pressure of air in chamber 140 is a combined function of the compressor generated air pressure in conduit 46 and the position of valve 132. The air contained in chamber 140 is, therefore, responsive to the air pressure generated by the compressor 12 of the engine 10 and modified by ambient air temperature by means of the valve 132. Conduit 144 is in communication with the chamber 140 and is operative to transmit the air from conduit 140 to the three branch conduits 146, 148 and 150 which lead, respectively, to the chambers 124, 122 and 116. Restrictive bleed members 152, 154 and 156 are contained in the conduits 146, 148 and 150 respectively so as to limit the air flow therethrough. Restrictive bleed member 156 is threadedly secured in the housing 86 and extends externally so as to be manually adjustable. A further fixed restriction 158 is contained in the housing 86 so as to provide communication between the upper segment of chamber 100 and the atmosphere.

The first speed responsive device 82 is enclosed by a housing 160 and comprises: a pair of speed responsive flyweights 162 pivotably secured to the rotatable table member 164 which is rotated by means of external gear 166 which may further be connected to the rotatable drive shaft 54, shown in FIGURE 1. Speed responsive device 82 further includes first and second pivotable levers 168 and 170 which are rotatably secured about a point intermediate to their ends to the housing 160. The left end of lever 170 includes a projection 172 which absorbs a force generated by the flyweight members 162. The right end of lever 170 contacts a half-ball member 174 which is operative with a conduit 176 to exhaust varying quantities of air therefrom. Lever 168 is connected to the lever 170 by means of the projection 178 which permits a small amount of relative movement between said levers. Compression spring 180 is contained between the levers 168 and 170 to urge the left end of said levers a maximum distance apart with respect to each other. The right end of lever 168 is operative with the half-ball 182 to control the exhaust of varying quantities of air from the conduit 184. Housing 160 includes a relatively large opening 186 for permitting the air escaping from the conduits 176 and 184 to discharge to the atmosphere. Power lever 64 is connected to cam 188 to rotationally position said cam in response to a manual input signal. A third pivotably secured lever 190 contacts cam 188 on one end and a spring 192 on the other to transmit a force to lever 168 and 170 that reflects the position of power lever 64.

The second speed responsive device 84 is contained within a housing 200 and includes a pair of flyweights 202 pivotably mounted to a rotatable table member 204 which is rotated by the externally mounted gear member 206 which is connected to drive shaft 62 shown in FIGURE 1. Speed device 84 further includes lever 208 which contains a projection 210 for contacting said flyweight. Said lever 208 is pivotably mounted about an intermediate point and contacts half-ball valve 212 which is operative with the conduit 214 to exhaust varying quantities of air therefrom. Externally mounted speed lever 68 is connected to variable height cam 216 so as to position said cam rotationally. Lever 218 is pivotably secured to the housing 200 and contacts cam 216 on one end and spring 220 on the other to transmit a force to one end of lever 208 which reflects the position of speed lever 68. Housing 200 further includes large opening 222 to exhaust the air contained therein to the atmosphere.

In FIGURE 3 there is shown a curve illustrating some of the operating characteristics of the present invention. The ordinate of the curve shown in FIGURE 3 is representative of the fuel flow supplied to the manifold 20 of the engine 10, while the abscissa represents the speed of the first turbine 14 or compressor 12. Curve 230 represents the fuel flow versus speed relationship during engine acceleration, while curve 232 represents this relationship for engine steady state operation and curve 234 represents the deceleration range of operation. Curves 236, 238 and 240 represent the engine fuel flow versus speed relationship during idle, intermediate, and maximum speed governing ranges of operation.

In FIGURE 4, there is shown a modification of a portion of the regulator device 80 of FIGURE 2 in accordance with the present invention. This modification provides a more simplified apparatus for accomplishing the objects of the present invention by eliminating certain refinements which may not be necessary in a given installation. Components, that the modification shown in FIGURE 4 has in common with the regulating device of FIGURE 2 are identically numbered and are: conduits 146, 150, 176 and 184 which are operative to transmit air pressures as described in connection with FIGURE 2; lever 114 which controls a metering valve; evacuated bellows 104; and connecting rod 110. The modification is further comprised of a bellows 250 which is designed to have a larger effective pressure responsive area than bellows 104 and is connected to the rod 110 at its center. Bellows 250 is further fixedly secured to the housing to form a first chamber 252 and a second chamber 254 within said housing. Air pressure generated by the compressor 12 of engine 10 and modified by the ambient air temperature responsive valve 132 is transmitted through the conduit 150 to chamber 252 where it communicates exteriorly with bellows 104 and interiorly with bellows 250. Conduit 176 further connects chamber 252 to the first speed responsive device 82 as illustrated in FIGURE 2. A further air pressure obtained from the same source as that in conduit 150 is transmitted through conduit 146 to the second chamber 254 where said pressure is in communication with the exterior of bellows 250 to provide a force acting on said bellows that is in opposition to the force due to pressure in chamber 252. Conduit 184 connects chamber 254 to the first speed responsive device 82 and the second speed responsive device 84 as shown in FIGURE 2.

FIGURE 5 shows further operating characteristics which may be desired, and fall within the scope of the present invention. Curve 230 is representative of the acceleration range of operation as illustrated in FIGURE 3, and is further shown in a possible relationship with an engine compressor stall region represented by the cross hatched marks. For engines requiring rapid acceleration characteristics it may be desired to provide an increased or stepped up acceleration fuel flow range once the engine has passed the speed at which compressor stall is a problem. This desired operating characteristic is represented by the curve 242 and may be considered a modified acceleration range curve.

Operation

The operation of the present device will be disclosed by describing the manner in which it functions during a typical cycle of operation. As a starting point, it is assumed that the engine 10 is operating under steady state conditions as for example at point A, shown on FIGURE 3. Under this condition, the engine is neither accelerating nor decelerating, but rather the fuel supplied to manifold 20 is just sufficient to produce power to maintain the engine at a substantially constant speed. The rotation of compressor 12 causes it to generate a pressure which is sensed by probe 44 transmitted through conduit 46 a 1 thence to the three chambers 118, 122 and 124 of the regulating device 80. Ambient air pressure from the atmosphere is transmitted through restrictive orifice 158 into the chamber 100 where it communicates with the bellows 104 and 118. Thus the pressure forces acting on bellows 104, 108, diaphragms 116, and 120 are operative in combination to maintain the metering valve 94 in a predetermined position. Power lever 64 is maintained in an intermediate position to supply an intermediate force to the lever 168. At the same time, the speed of turbine 14 is transmitted to the gear 166 of the speed responsive device 82 and is operative to rotate flyweight members 162 to produce an upward force acting on levers 170 and 168. Under the conditions assumed, the force from flyweights 162 is operative to compress spring 180 and provide physical contact between the levers 170 and 168 through the projection 178. Servo valve 174 would be in a wide open position and servo valve 182 in an intermediate position permitting a controlled amount of air leakage from chamber 124 of the regulating device 80. The speed lever 68 of the speed responsive device 84 would be positioned in a maximum setting position whereby the force transmitted by spring 220 to lever 208 would be a maximum. Flyweight members 202 produce an upward force acting on projection 210 of the lever 208 which is responsive to the speed of the second turbine 26 of the engine 10 as transmitted through gear 206. Under the conditions assumed, the upward force from flyweight members 202 would be less than that provided by spring 220 so that half-ball servo valve 212 is maintained in a closed position. If it is now desired to increase the engine performance from that represented by the point A to that represented by the point B of FIGURE 3 power lever 64 of the speed responsive device 82 would be advanced from an intermediate to a maximum position whereby lever 190 is rotated in a clockwise direction due to increased cam height of cam member 188. Spring 192 is compressed providing an increased force to lever 168 moving said lever counterclockwise and half-ball valve 182 from an intermediate to a closed position. Closure of half-ball 182 causes a pressure increase in the chamber 124 of the regulating device 80 which acts on diaphragm member 120 which through rod 110 and lever 114 will move metering valve 94 in an opening direction. This will cause a fuel flow increase as represented by the dashed line between the points A and C of FIGURE 3. The point C being on the acceleration curve 230 will cause the engine to accelerate in accordance with said curve and a progressively increasing pressure generated by compressor 12 and transmitted to the chambers 118, 122 and 124. This progressively increasing pressure acting on the pressure responsive members 108 will cause a progressively increasing fuel flow as represented by the curve 230. Further, as the speed of compressor 12 increases the speed transmitted to gear 166 of the speed responsive device 82 also increases providing a progressively increasing force acting on lever 168 tending to move half-ball valve 182 in the open position. When the point D of the acceleration curve 230 is reached, the upward force provided by flyweight members 162 to the lever 168 overcomes the increased increment of force supplied by spring 192 thus opening half-ball valve 182 and exhausting air from chamber 124 of the regulating device 80. As air is exhausted from chamber 124, the pressure contained therein decreases permitting metering valve 94 to move in a closing direction and decrease fuel flow in accordance with the characteristics of curve 240 shown in FIGURE 3. As the point B is attained, the engine is again operating on steady state curve 232 where the fuel being supplied is just sufficient to maintain a constant speed so that the engine 10 stabilizes out at this point. If during the acceleration cycle previously described, the second turbine 26 overshot a predetermined maximum safe limit as established by speed lever 68 of the speed responsive device 84, the flyweight members 202 would produce a force overcoming the force supplied by spring 220 and open half-ball valve 212 thus reducing the pressure in chamber 124 and reduce fuel flow to engine 10 so as to prevent overshoot.

If it is now desired to decelerate from the point B to the point G shown in FIGURE 3, power lever 64 of the speed responsive device 82 will be positioned from a maximum to a minimum position and the force supplied by spring 192 to the lever 168 accordingly reduced. Thus, the force produced by flyweight members 162 will overcome the reduced force of spring 192 permitting lever 168 to rotate clockwise and open half-ball valve 182 to a maximum extent. When half-ball valve 182 is in its maximum open position pressure in chamber 124 of the regulator device 180 is rapidly decreased moving metering valve 94 in a closed direction and rapidly decreasing the fuel supplied to engine 10 in accordance with the dashed line between the points B and E illustrated in FIGURE 3. Inasmuch as the point E is on the engine deceleration curve 234 fuel supplied to said engine is less than that needed to maintain steady state operation so that the engine begins to decelerate as shown by curve 234 until the point F is reached. The deceleration of engine 10 causes a decreasing pressure supplied by compressor 12 to the pressure responsive chambers 118, 122 and 124 of the regulating device 80 such that metering valve 94 is moved in a further closed direction, as illustrated by curve 234. As the point F shown in FIGURE 3 is reached, the force supplied by flyweight members 162 has dropped off to the point where it is no longer sufficient to maintain half-ball valve 182 in a wide open position. Therefore, as the valve 182 begins to close and the pressure in chamber 124 increases, metering valve 94 will again be moved in an open position in accordance with the curve 236 shown in FIGURE 3 until the point G is attained where the engine is again operating on a steady state curve 232.

In the acceleration and deceleration operation previously described, the speed of turbine 14 and compressor 12 of the engine 10 was closely controlled to produce a certain desired power delivered to the drive turbine 26 of said engine. The speed of the turbine 26 was permitted to seek that speed which is consistent with the power delivered to said turbine and the torque required to drive load 30. The only limitation on the speed of turbine 26 was that imposed by speed responsive device 84 to prevent said turbine from dangerously overspeeding. However, in many installations it may be desired to closely control the speed of the driven turbine 26 and allow the speed of turbine 14 to vary to supply the necessary power to maintain turbine 26 at a requested speed. This function may be readily accomplished in the present invention by setting power lever 64 of the speed responsive device 82 to a maximum overspeed position whereby the half-ball valve 182 is maintained in a closed position. Governing is then accomplished by placing speed lever 68 of the speed responsive device 84 in a desired position to provide a certain reference force through spring 220 to the lever 208. The flyweight members 202 which are responsive to the speed of turbine 26 would then provide an upward force tending to balance the force provided by spring 220 and control the position of half-ball valve 212 during the governing range of operation.

In engines operating close to the stall range, as illustrated in FIGURE 5, it may be desired to provide an increased rate of acceleration after the stall range has been avoided. For example, in FIGURE 5, the curve 230 may represent the maximum acceleration range curve permissible without encountering engine compressor stall problems. Therefore, by providing an increased flow increment curve 242 engine acceleration time may be reduced and compressor stall not encountered. During engine acceleration the force produced by springs 192 and 220 of the speed responsive devices 82 and 84 respectively exceed that supplied by the flyweight members 162 and 202 respectively such that the half-ball valves 182 and 212 are maintained in a closed position. Spring 180 of the speed responsive device 82 transmits a force to the lever 170 to maintain servo half-ball valve 174 in a closed position at the low speed end of the acceleration curve 230 when the force supplied by weights 162 is low. As the speed of flyweight members 162 increases to the point H of FIGURE 5 the force provided by spring 180 is sufficient to maintain valve 174 in a closed position. As the speed increases beyond that represented by the point H, the flyweight members 162 produce a force which overcomes that provided by spring 180 permitting lever 170 to move clockwise relative to lever 168 thus opening half-ball valve 174 and exhausting air from chamber 118 of the regulator device 80 to establish a pressure differential across diaphragm 116 which moves metering valve 94 in an open direction. By opening metering valve 94, increased flow is permitted to flow to engine 10 during the acceleration range of operation in accordance with the curve 242 shown in FIGURE 5. The slope or relative steepness of curve 242 may be varied by the externally adjustable bleed 156 shown in FIGURE 2 which is operative to control the rate of air flow into chamber 118. The stall range, illustrated in FIGURE 4, is dependent to some extent upon ambient air temperature and for this reason it is desired to control the acceleration curve 230 as a function of ambient air temperature. This function is accomplished by the ambient air temperature responsive valve 132 located in the conduit 46 and operative as previously described.

Further novelty of the instant invention may be illustrated by consideration of FIGURE 3 where it should be noted that the low fuel flow end of acceleration curve 230 requires a greater fuel flow than the idle steady state point G. In small flow capacity engines the pressure delivered by compressor 12 under start conditions may be very close to atmospheric pressure. Thus in pneumatic air governing systems where the compressor generated air pressure is exhausted to the atmosphere in the governing range it would not be possible to obtain fuel flows less than that at start conditions unless special means were provided. In the present invention the bellows 108, diaphragm 116, and diaphragm 120 have progressively increasing working effective areas. This permits a pressure differential acting across one of the larger effective areas to position metering valve 94 a greater distance for a given pressure change than would be the case of the pressure differential working across one of the smaller surfaces.

In the modification shown in FIGURE 4, the pressures contained in chambers 252 and 254 are equal when there is no air flow out of conduits 176 and 184. This will occur when the servo valves 182, 174 and 212 of the speed responsive devices 82 and 84 are closed. Under this condition the pressures acting on bellows 250 produce forces which balance out so that said bellows is not operative to position lever 114. Ambient air temperature and compressor pressure responsive air in chamber 252 acts on evacuated bellows 104 to position lever 114 and metering valve 74 during the engine acceleration range, as represented by curve 230 of FIGURE 5. When the point H is reached, servo valve 174 opens as previously described to exhaust air from conduit 176 and chamber 252 to establish a pressure differential across the larger bellows 250 which is operative to move metering valve 94 in a further open position as indicated by curve 242. Governing is accomplished by exhausting air from conduit 184 and chamber 254 by operation of valves 182 and 212 as previously described which establishes a pressure differential across bellows 250 which moves metering valve 94 in a reduced fuel flow position.

Although the instant invention has been shown with certain degree of particularity, it should be understood the embodiments were made by way of example only and that various changes in form and relative arrangement of parts may be made to suit individual engine requirements.

I claim:

1. In a fuel control system for an engine having a compressor, the combination of a movable fuel control member, a first pressure responsive member having a first movable surface of predetermined area, first means transmitting an air pressure generated by said compressor to said first pressure responsive member so that said first movable surface is controlled as a function of variation in said compressor generated air pressure, a second pressure responsive member having a second movable surface of predetermined area greater than said first movable surface, second means transmitting an air pressure generated by said compressor to opposite sides of said second movable surface, speed means responsive to an engine operating speed ineffective in a first range of operation to vary the pressure on said second surface and capable of varying the pressure acting on one side of said second surface throughout a second range of operation as a function of said engine operating speed to provide different ranges of fuel flow sensitivity to pressure changes, and an axially movable rod interconnecting said first and second pressure responsive members and said movable fuel control member so as to position said movable fuel control member in response to the sum of pressure forces acting on said first and second pressure responsive members.

2. In a fuel control system for an engine having a compressor, the combination of a movable member for controlling the flow of fuel to said engine, first and second pressure responsive members having predetermined surface areas, said second pressure responsive member having a larger predetermined surface area than said first pressure responsive member, first means transmitting an air pressure generated by said compressor to one side of the surface area of said first pressure reponsive member, second means transmitting an air pressure generated by said compressor to opposite sides of the surface area of said second pressure responsive member, speed means responsive to an engine operating speed ineffective in a first range of operation to vary the pressure acting on said second pressure responsive member and capable of varying the pressure on one side of said second pressure responsive member throughout a second range of operation as a function of engine speed to provide different ranges of fuel flow sensitivity to pressure changes, and movable linkage means interconnecting said first and second pressure responsive members to said movable member such that said movable member is positioned in response to the combined pressure forces acting on said first and second pressure responsive members.

3. In a fuel control system as claimed in claim 2 including ambient air temperature responsive means operative with said first and second means transmitting an air pressure for controlling the air being transmitted as a function of ambient air temperature.

4. In a fuel control system as claimed in claim 2 wherein said means responsive to an engine operating speed is an all-speed governor.

5. In a fuel control system as claimed in claim 2 including means communicating ambient air pressure to the other side of the surface area of said first pressure responsive member.

6. In a fuel control system as claimed in claim 2 including an evacuated member connected to said first pressure responsive member to provide a reference force thereto representative of substantially absolute zero air pressure.

7. In a fuel control as claimed in claim 2 wherein said speed means is operative to move said movable member in a flow decreasing direction with an increase in engine operating speed.

8. In a fuel control system for an engine having a compressor and first and second independently rotatable turbines, the combination of a movable valve member for controlling the flow of fuel to said engine, first and second pressure responsive members having surface areas of predetermined size, said second pressure responsive member having a larger surface area than said first pressure responsive member, first means transmitting an air pressure generated by said compressor to one side of the surface area of said first pressure responsive member, second means transmitting an air pressure generated by said compressor to both sides of the surface area of said second pressure responsive member, first speed means responsive to the speed of said first turbine and operative to vary the pressure on one side of said second pressure responsive member, second speed means responsive to the speed of said second turbine and operative to vary the pressure on said one side of said second pressure responsive member, said first and second speed means having a first range of operation wherein said speed means are ineffective to vary the pressure on said pressure responsive member and a second range wherein said speed means are capable of varying said pressure throughout said second range to provide two control ranges of different sensitivity to pressure changes, and linkage means interconnecting said first and second pressure responsive members to said movable valve member such that said movable valve member is positioned in response to the combined movement of said first and second pressure responsive members.

9. In a fuel control system as claimed in claim 8 wherein said first and second speed means are first and second speed governors respectively.

10. In a fuel control system as claimed in claim 8 including ambient air temperature responsive means operative with said first and second means transmitting an air pressure for controlling the air being transmitted as a function of ambient air temperature.

11. In a fuel control system for an engine having a compressor, said fuel control system including a metering valve for controlling the flow of fuel to said engine, the combination of a pressure responsive member responsive to an air pressure generated by said compressor, a diaphragm communicating with said compressor generated air pressure on both sides and having a greater sensitivity to pressure than said pressure responsive member, an exhaust valve communicating with the air pressure on one side of said diaphragm, speed means responsive to an engine operating speed operative in a first range of operation to maintain said exhaust valve in a closed position and throughout a second range to control said exhaust valve in response to speed changes and thereby create a pressure differential across said diaphragm that varies as a function of engine speed to provide two ranges of control sensitivity, and linkage means connecting said diaphragm and said pressure responsive member to said metering valve so that said metering valve is controlled as a combined function of said pressures acting on said diaphragm and said pressure responsive member.

12. In a fuel control system as claimed in claim 11 including temperature means responsive to ambient air temperature operative to control the air pressure acting on said pressure responsive means as a function of ambient air temperature.

13. In a fuel control system for an engine including a compressor, said fuel control system including a metering valve movable in a first flow increasing and a second flow decreasing direction, the combination of a first member responsive to an air pressure generated by said compressor connected to said metering valve for moving said valve in said first direction with an increase in air pressure generated by said compressor and for moving said metering valve in said second direction with a decrease in air pressure generated by said compressor, a second member movable in response to pressure communicating with air pressure generated by said compressor on two opposing sides thereof, said second member having a larger pressure responsive effective area than said first member connecting means interconnecting said first and second members so that said metering valve is controlled as a combined function of the pressure acting on said members, an air exhaust valve operative to vary the air pressure acting on one side of said second member as a function of the position thereof, speed means responsive to an engine operating speed and connected to said air exhaust valve to maintain said exhaust valve in a closed position in one range of engine operation and to control the position thereof as a function of said engine operating speed throughout another range of engine operation to provide different ranges of control sensitivity.

14. In a fuel control system for an engine as claimed in claim 13 wherein said speed means is operative to move said metering valve in said first direction with a decrease in said engine operating speed and to move said metering valve in said second direction with an increase in said engine operating speed.

15. In a fuel control system for an engine as claimed in claim 13 wherein said engine operating speed is compressor speed and said speed means is operative to move said metering valve in said first direction with an increase in said engine operating speed and to move said metering valve in said second direction with a decrease in said engine operating speed.

16. In a fuel control system for an engine having a compressor; the combination of a movable member for controlling the flow of fuel to said engine; a housing having an interior chamber formed therein; first and second pressure responsive members peripherally secured to said housing in said interior chamber to form three expansible subcompartments therein, a first of said three expansible subcompartments formed by said first pressure responsive member and said housing and containing a reference pressure therein, a second of said three expansible subcompartments formed intermediate to said first and second pressure responsive members, and a third of said three expansible subcompartments formed by said second pressure responsive member and said housing; said second pressure responsive member having a larger effective area than said first pressure responsive member; means interconnecting said first and second pressure responsive members and said movable member to control the flow of fuel to said engine as a function of the combined movement of said pressure responsive members; a first conduit receiving at one end pressure generated by said compressor and terminating at the opposite end at said second expansible subcompartment; a fixed restrictive bleed member intermediate the ends of said first conduit operative to permit the passage of a limited quantity of compressor air to the atmosphere; first and second adjustable valve members in said first conduit located upstream and downstream of said fixed bleed member respectively; and a second conduit connecting said third expansible subcompartment and said first conduit at a point intermediate to said fixed bleed member and said second adjustable valve member.

17. In a fuel control system as claimed in claim 16 including temperature responsive means responsive to engine inlet air temperature connected to said first adjustable valve for controlling the position thereof in response to the temperature of inlet air.

18. In a fuel control system as claimed in claim 17 wherein said temperature responsive means is comprised of a series of temperature compensating disc members.

19. In a fuel control system for an engine having a compressor, said fuel control system including a fuel valve that is movable in position to control the flow of fuel to the engine, first and second pressure responsive means operative to control the position of said fuel valve in response to actuating pressures, said second pressure responsive means including two opposing sides and having greater sensitivity to pressure changes than said first pressure responsive means such that said second pressure responsive mean is operative to cause a greater change in the position of said fuel valve than said first pressure responsive means for a given pressure change, first transmitting means operative to transmit a pressure generated by said compressor to said first pressure responsive means to provide an actuating pressure therefor, second transmitting means operative to supply pressure generated by said compressor to said two opposing sides of said second pressure responsive means such that said second pressure responsive means is normally in a balanced or inoperative condition, and means responsive to an engine speed ineffective in a first range of operation to exhaust air from one of said two opposing sides of said second pressure responsive member and operative throughout a second range of operation to exhaust air on one of said two opposing sides so that said second pressure responsive member is operative to aid in positioning said fuel valve with different degrees of sensitivity for selected ranges of engine operation.

References Cited in the file of this patent
UNITED STATES PATENTS

| | | |
|---|---|---|
| 2,613,029 | Wilde | Oct. 7, 1952 |
| 2,643,514 | Jubb | June 30, 1953 |
| 2,775,231 | Silver | Dec. 25, 1956 |
| 2,848,868 | Jensen | Aug. 26, 1958 |
| 2,939,280 | Farkas | June 7, 1960 |
| 2,959,002 | Best | Nov. 8, 1960 |

FOREIGN PATENTS

| | | |
|---|---|---|
| 204,244 | Australia | Nov. 14, 1956 |
| 1,174,369 | France | Nov. 3, 1958 |